United States Patent [19]

Stolz

[11] 4,141,599

[45] Feb. 27, 1979

[54] ENDLESS TRACK

[75] Inventor: Hans-Peter Stolz, Ettlingen, Fed. Rep. of Germany

[73] Assignee: Ing. Ludwig Pietzsch, Karlsruhe, Fed. Rep. of Germany

[21] Appl. No.: 767,209

[22] Filed: Feb. 9, 1977

[30] Foreign Application Priority Data

Apr. 5, 1976 [DE] Fed. Rep. of Germany ....... 2614691

[51] Int. Cl.² ............................................. B62D 55/20
[52] U.S. Cl. ............................... 305/35 R; 305/58 PC
[58] Field of Search .................. 305/58 PC, 59, 58 R, 305/56, 35 R, 36, 42; 403/389, 387, 391, 396

[56] References Cited

U.S. PATENT DOCUMENTS

| 2,283,936 | 5/1942 | Knox | 305/59 X |
| 3,171,695 | 3/1965 | Schick | 305/58 |
| 3,591,242 | 7/1971 | Borner | 305/36 |

Primary Examiner—John P. Shannon
Attorney, Agent, or Firm—Lawrence E. Laubscher

[57] ABSTRACT

In an endless track having chain links which comprise tubular bodies arranged transverse to the direction of movement and connected to the adjacent chain links, as seen in the direction of movement, by connector links as well as rod members which extend through the connector links and through the tubular bodies, the tubular bodies and, if desired, the connector links of each chain link being so dimensioned, transverse to the moving direction, that they support each other laterally from a certain given flexure of the chain link on.

7 Claims, 10 Drawing Figures

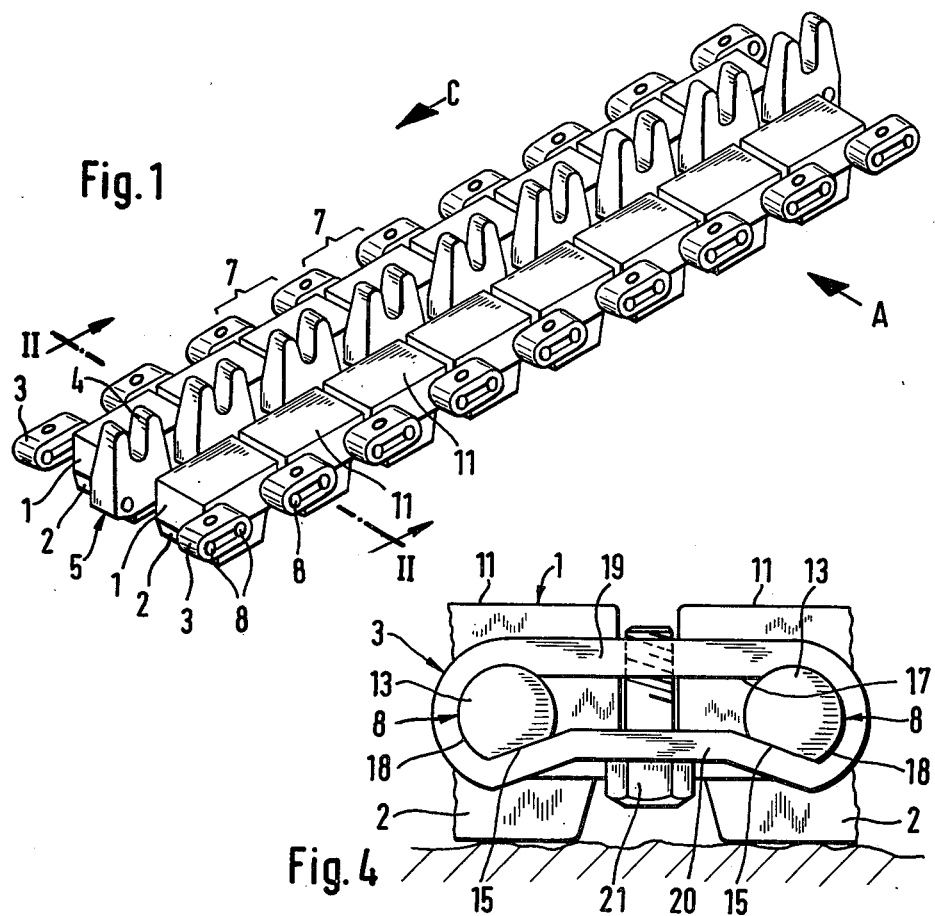
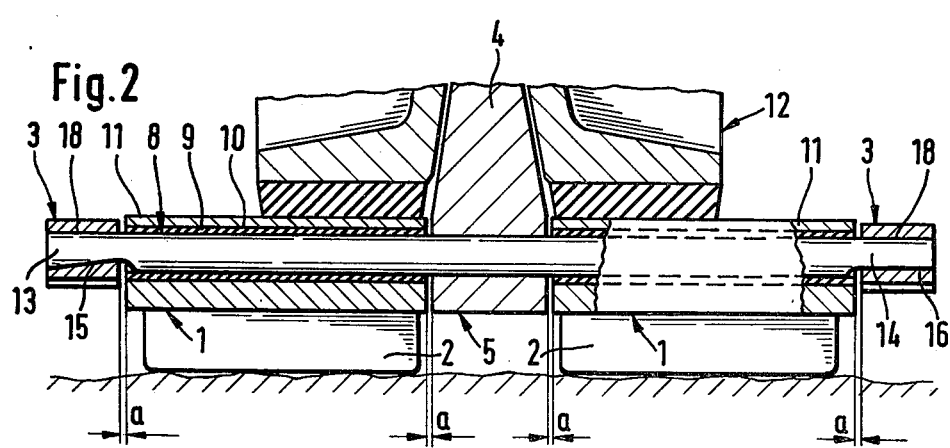

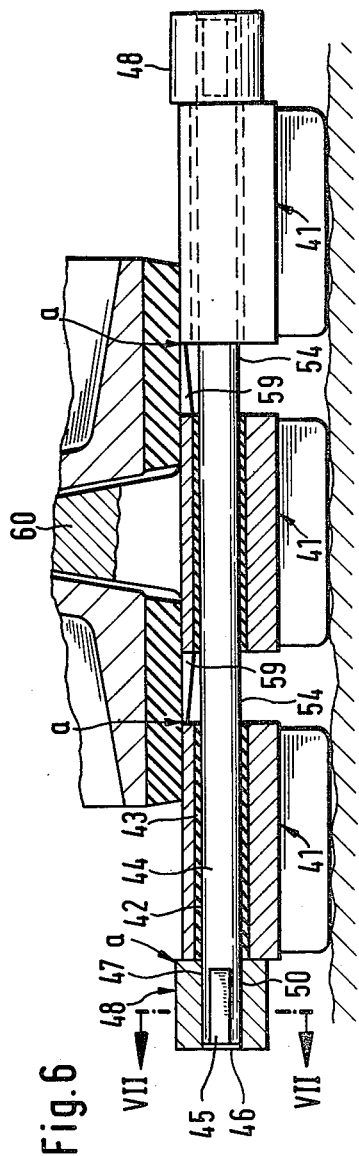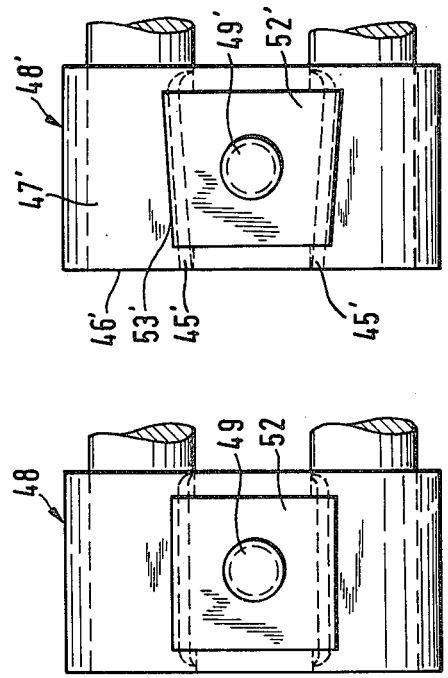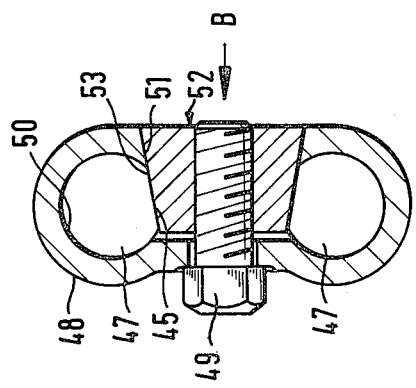

ENDLESS TRACK

BRIEF DESCRIPTION OF THE PRIOR ART

The instant invention relates to an endless track, the chain links of which comprise tubular bodies arranged tranverse to the direction of movement and connected to the adjacent chain links, as seen in the direction of movement, by connector links as well as rod members which extend through the connector links and through the tubular bodies.

In operation the rods extending through the tubular bodies and connector links are subjected to bending stresses which may be caused by the traction drive force acting transverse of the rods in the direction of movement of the chain but may also have their origin in weight load acting in vertical direction at driving conditions at which the chain is supported on the ground at its edges only, for example when driving over a rut or groove in the ground.

SUMMARY OF THE INVENTION

It is the principal object of the present invention to design an endless track of the kind defined such that its elements, in particular the rod members may have smaller dimensions than heretofore possible to withstand and endure a given bending load, especially in vertical direction.

It is another object of the invention to provide a chain link of smaller overall dimensions for an endless track, thus enabling savings of material, manufacture and storage expenditure.

It is still another object of the invention to prevent the ends of the rods used in an endless track from slipping out of the respective connector links.

Finally, it is also an object of the invention to increase the safety of the arrangement by providing for form-lock engagement of the rod ends.

Thus it is provided, in accordance with the invention, that the tubular bodies and, if desired, the connector links of each chain link are so dimensioned, transverse of the running direction, that they support each other laterally from a certain given flexure of the chain link on. In this manner overload protection of the rods is obtained which permits the desired smaller dimensions to be applied at given permissible bending loads. With an endless track according to the invention, starting with the predetermined flexure caused, for instance, by the weight of a vehicle equipped with the endless track, it is no longer the rods alone which accomodate the bending load but, in addition, also the tubular bodies and, if desired, the connector links. Thus the rods enjoy partial relief of the bending stress so that they may be designed weaker in diameter. In the same manner also the dimensions of the bores which receive the rods in the tubular bodies and determine the dimensions of the tubular bodies and the bores in the connector links may be made smaller. This permits a smaller overall size of the chain link and thus offers savings in material, manufacture, and storage expenditure. This is achieved simply by fitting the tubular bodies and/or connector links transverse to the direction of movement, i.e. in their longitudinal extension. In practice a clearance will be provided within such limits of tolerance between the tubular bodies and/or the connector links as will be taken up from the predetermined flexure on. In the critical case in which the predetermined flexure is zero, the tubular bodies and/or connector links already abut each other laterally even when not subjected to loading so that the rods are relieved from any bending stress. In other words, they are exposed to less deflection than they would have to endure if the elements of the chain link were unsupported.

The ends of the rods may be held fixed against rotation and displacement in the longitudinal direction in the end connector links used at the sides of each chain link to prevent them from slipping out of those end connectors. Flat sections which are known per se as means of preventing rod rotation may serve this purpose. In certain cases it may be sufficient, to preventing the rods from becoming displaced in longitudinal direction, if the flat sections are disposed parallel to the longitudinal rod axis and pressed against each other in friction lock, as is known to prevent rotation. The safety may be further increased by form-lock engagement of the rod ends which is achieved, for instance, by flat sections which are inclined with respect to the longitudinal rod axis and pressed against each other under wedging action.

In an endless track in which the tubular bodies and/or connector links include webs extending into spaces between adjacent elements of a chain link or between two successive chain links, as seen in running direction, so as to enlarge the roll-off surface for the chain wheels and thus afford smoother running, the tubular bodies and/or connector links may support each other laterally through those webs which are dimensioned accurately in the direction of movement as well as transversely thereof.

BRIEF DESCRIPTION OF THE FIGURES

The invention will be described further, by way of example, with reference to the accompanying drawings which show different embodiments and in which:

FIG. 1 is a perspective elevational view of a piece of a connector link chain including tubular bodies and connector links dimensioned according to the invention, FIG. 2 is a sectional elevation, to an enlarged scale, along line II—II of FIG. 1 extending along a rod and showing the assembly in a condition not subjected to bending stress, FIG. 4 is an elevational view, to an enlarged scale, of a connector link and parts of the chain links, as seen in the direction of arrow A of FIG. 1, FIG. 6 is a longitudinal sectional view of a rod along line VI—VI of FIG. 5, FIG. 7 is a sectional view of a connector link taken along line VII—VII of FIG. 6, FIGS. 8 and 9 are elevational views of different designs of the connector link shown in FIG. 7, as seen in the direction of arrow B of FIG. 7.

DETAILED DESCRIPTION

Figure 3:
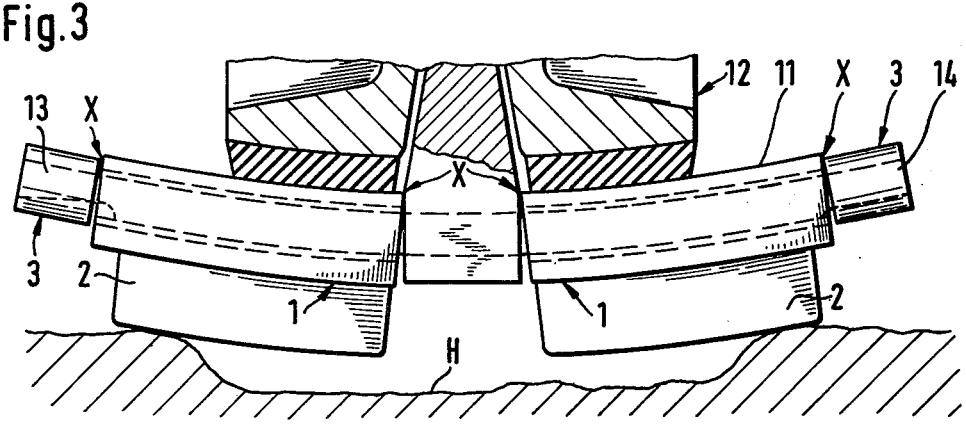
FIG. 3 is a view similar to FIG. 2, yet not in section, of a chain link in a position above a groove in the ground.

In each chain link the connector link chain shown in FIG. 1 comprises two tubular bodies 1 with running pads 2 at their underside, two end connector links 3 at either side of the chain, and an intermediate connector link 5 with a chain tooth 4 guiding the vehicle by means of the tread rollers 12 which roll-off the plane roll-off surfaces 11 of the tubular bodies 1.

Each chain link generally designated 7 is connected to the successive chain link 7 through the connector links 3, 5 by means of rod members 8 which extend through the connector links and the tubular bodies.

In the area in which rod 8 passes through the tubular bodies 1 a plurality of rubber sleeves 9 which have an excess dimension as compared to through bores 10 in the tubular bodies 1 are fixed on the rods by vulcanization. Together with their rubber sleeves 9 fixed by vulcanization the rods 8 are pressed into the through bores 10. As the rubber sleeves are capable of twisting, they permit tilting of the rods 8 in the through bores 10 by the angles necessary for chain return.

The tubular bodies 1 and the connector links 3, 5 are accurately dimensioned in a direction transverse of the direction of movement C of the chain so that accurate clearance a within manufacturing tolerances is obtained between the tubular bodies and the connector links when the chain links are not subjected to vertical bending load. Beginning with a degree of flexure which can be predetermined, this clearance is cancelled in the upper zone at x because of the bending deformation so that upon further increase of the bending load the tubular bodies and the connector links 3, 5 constitute a bridge which takes up the bending stress. It may be seen from FIG. 3 that such vertical bending stress occurs when the vehicle drives over a rut or groove H in the ground. The end connector link 3 are retained on the ends 13, 14 of rod 8 not only against rotation but also against longitudinal displacement in order to prevent these ends 13, 14 of the rod 8 from slipping inwardly of the end connector links 3 under conditions as the one described. For this purpose the ends 13, 14 of rods 8 are provided with flat sections 15, 16 which cooperate with corresponding flat sections in the end connector links. At the left end, as seen in FIG. 2, these flat sections 15 extend obliquely with respect to the longitudinal axis of the rod so that the end connectors are held under wedging action i.e. in form lock against slipping of the rods inwardly. This guarantees that the rod ends are securely held which are thus expanded in their longitudinal extension upon further increase of the bending stress.

However, it is apparent that even with flat sections 16 extending parallel to the longitudinal axis of the rods, such as shown for the right end 14 of the rod, as seen in the drawing, sufficient force can be applied merely by friction-lock establishing contact pressure of the corresponding flat sections of the connector link 3 to prevent the rods from slipping out.

In practice, of course, either the left or the right alternative shown in FIG. 2 is selected to realize the flat sections at the rod ends, depending on the respective use of the chain.

The one-piece end connector links 3 have an opening 17 merging at either end into through bores 18 which serve to receive the rod ends 13 and 14, respectively, and being enclosed all around. As may be seen in FIG. 4, the two opposed material bridges 19, 20 at either side of opening 17 can be contracted by means of a bolt 21. Hereby the contact pressure can be produced which is required to press the flat sections in through bores 18 against the flat sections 15, 16 of rod ends 13, 14.

The end connector links 3 may also be divided in longitudinal direction.

It is also possible to provide a greater even number of tubular bodies 1 for each chain link instead of only two. In that case, apart from the center which again contains an intermediate connector link 5 provided with a chain tooth 4, intermediate connector links similar to the end connector links 3 are inserted between the individual tubular bodies. These intermediate connector links have surfaces which are flush with the surfaces 11 of the tubular bodies to increase the roll-off surface for the correspondingly wider tread rollers, thus contributing to improve the smooth running. When it is desired to enlarge the chain, this type of structure is preferred in that it offers more convenient storage and savings of weight and material as compared to a structure employing wider structural elements, especially wider tubular bodies. It is to be understood that even with such a wider chain having a correspondingly greater number of tubular bodies and connector links, these elements are accurately dimensioned in a direction transverse of the running direction of the chain so that, beginning with a predetermined flexure, the tubular bodies and the connector links support each other and again form a bridge protecting the rods from excessive bending stress.

Figure 5:
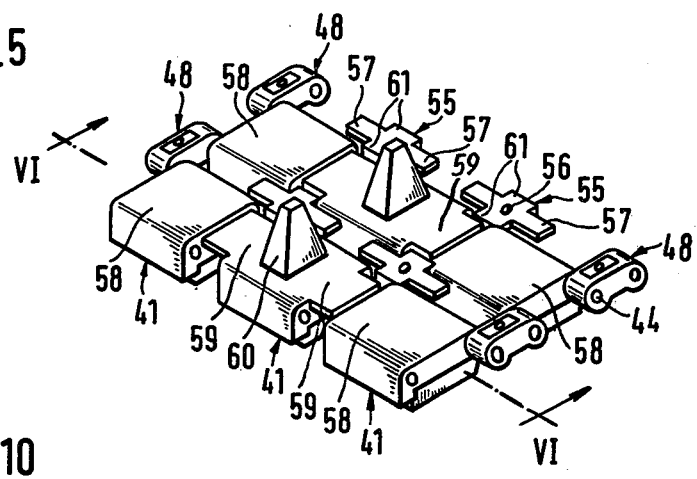
FIG. 5 is a perspective view of a piece of a connector link chain according to another embodiment of the invention.

FIG. 5 likewise shows an embodiment of a chain which is wider than the embodiment according to FIG. 1 but which comprises three tubular bodies, in other words an uneven number of tubular bodies per chain link. Just like the tubular bodies 1 the tubular bodies, designated in general by reference numeral 41, have through bores 42 to receive rods 44 provided with rubber sleeves 43 which are fixed on the bolts by vulcanization. In this case the rubber sleeves mentioned are also provided in a central tubular body 41 which carries a chain tooth 60. On principle the rods 44 are of the same structure as rods 8 of the embodiment shown in FIGS. 1–4. The difference resides in the fact that flat sections 45 extending parallel to the axis are provided spaced from the front end faces 46 of the rods ends 47. Here, the rod ends 47 are adapted to the end connector links 48 which have round through bores 50 for the rod ends 47. These through bores 50 are intersected by a wedge-shaped recess 51 into which fits a wedge piece 52. In assembled condition wedge piece 52 is clamped by the wedge faces 53 against the flat sections 45 of rod ends 47 by means of a bolt 49 to establish a connection which is fixed against rotation and at the same time prevents the rods 44 from slipping in the direction of their longitudinal extension.

With this modification of the end connectors 48 and of the flat sections 45 a form-lock engagement between the end connectors and the rod ends is obtained by the cooperation of the wedge pieces with the flat sections extending parallel to the axis because the flat sections do not extend all the way to the front end faces 46 of rod ends 47.

As shown in FIG. 9, such a form-lock joint can also be established if wedge piece 52' is given the shape of a trapezoid in top plan view and provided with wedge faces 53' which extend obliquely relative to the longitudinal axis of the rod. These wedge surfaces cooperate with correspondingly inclined flat sections 45' which, with this embodiment, extend all the way to the front end faces 46' of the rod ends 47'.

The embodiment according to FIG. 5 comprises divided intermediate connector links 55 of which only the upper part is to be seen. The lower part is adapted to be clamped against the upper part and at the same time against the rods 44 by means of bolts 56. The parts of the intermediate connectors 55 together form recesses which, in assembled condition, surround approximately three quarters of the total circumference of the rods in the areas 54 in which they are free of the rubber sleeves 53. The intermediate connector links have areas 57 which extend transversely of the running direction of the chain between adjacent tubular bodies 41 and form a flush surface with the surfaces 58 of the tubular bodies 41. Likewise flush with this surface is the surface of webs 59 which extend from the central tubular bodies 41 toward both sides to the adjacent tubular bodies 41 transversely of the running direction of the chain. These webs 59 do not reach as far as the overall dimension of the tubular bodies 41 in the running direction of the chain but instead leave spaced into which extend webs 61 provided at intermediate connector links 55 and oriented in running direction and in a direction opposed to the same, respectively.

The dimensions of webs 59 at central tubular body 41 and of webs 57 and 61 at intermediate connectors 55 (to be seen only in FIG. 5 but not in FIG. 6) as well as the dimensions of the outer tubular bodies 41 and of the end connector links 48 in a direction transverse of the running direction of the chain are so selected that again a predetermined clearance a is obtained which, in the present case, is zero. By virtue of this arrangement, upon vertical deflection the rods 44 are partly relieved from the very beginning from any bending stress.

Structural elements such as shown in FIG. 5 can also be used to make wider chains with a greater uneven number of tubular bodies per chain link.

Figure 10:
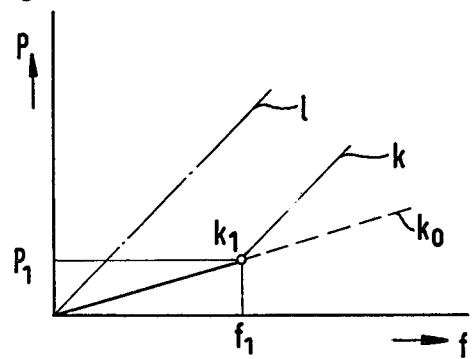
FIG. 10 is a graph demonstrating the bending load P above the vertical flexure f of the rod or chain link.

FIG. 10 shows the course of the bending load P above the bending flexure f of a chain link such as shown in FIGS. 1 to 3 or 5 and 6.

The continuous curve k represents the course of the loading above the deformation, starting from a finite clearance a (FIG. 2). When a flexure $f_1$ or a bending load $P_1$ is reached, the tubular bodies have come to abut each other or the intermediate connector links and form a stiffening bridge. The continuous curve k then bends at $k_1$ and continues more steeply. This means that a greater bending force must be applied to obtain the same deformation, in other words that the chain link as a whole has become stiffer. Curve $k_0$ is a discontinuous line showing how the load-deformation-characteristic would continue if the bolt were deformed alone without support by the elements of the chain link. Curve $k_0$ would soon get into ranges where the deformation or load would be too great. If one considers that in the range of higher load it is predominantly the tubular bodies and the connector links and only partly the rods which have to withstand bending stress, it is evident that the rod may be made of smaller dimensions at the same total load than if the rod alone also had to endure maximum bending stresses. Accordingly, also the through bores 10 and 42, respectively, in the tubular bodies and the rod receiving bores 18 and 50, respectively, in the end connector links may be made to smaller dimensions which in turn entails a reduction in size of the tubular bodies as well as the connector links.

The dash-dotted line in FIG. 10 shows the course of a curve 1 which is obtained when the clearance a is zero from the very beginning (FIG. 6). In this case the tubular bodies and the connector links support bending loads together with the rod from the very beginning.

The present embodiments are to be considered as in all repsects illustrative and not restrictive, the scope of the invention being indicated by the appended claims.

What is claimed is:

1. An endless track for propelling vehicles and the like, comprising
    (a) a plurality of transversely spaced columns of longitudinally extending body members containing at their forward and rear ends aligned through openings, respectively;
    (b) a plurality of transversely spaced columns of longitudinally extending connector links arranged on opposite sides of said columns of body members, respectively, said connector links each containing parallel transverse through openings adjacent their forward and rear ends, respectively, the openings in the forward and rear ends of said connector links being aligned with the openings contained in the rear and forward ends of said body members, respectively; and
    (c) a plurality of rod members each extending transversely the entire width of the track through the aligned openings contained in corresponding transverse rows of said body members and said connector links, respectively;
    (d) two connector links of each transverse row comprising end connector links arranged at opposite ends of the associated rod members adjacent the outermost faces of the outermost body members of the row, respectively, said two end connector links being spaced a greater distance than the sum of the widths of the body members and the remaining connector links arranged therebetween, thereby to define predetermined clearance spaces of manufacturing tolerance between the adjacent surfaces of said body members and said connector links;
    (e) at least one of said body members including laterally extending web portions the extremities of which are spaced from the adjacent body member by the said clearance space, the width of said clearance spaces being such that upon longitudinal flexure of each rod in a direction transverse to the direction of movement of the track, portions of the adjacent surfaces of the body members and the connecting links are brought into abutting engagement to provide lateral support in the form of a bridge for absorbing the transverse bending stress of the link.

2. Apparatus as defined in claim 1, wherein said web portions are arranged intermediate the ends of at least one body member contained in a transverse row between another pair of body members.

3. Apparatus as defined in claim 1, and further including means preventing rotation of said end connector links relative to the associated rods, respectively.

4. Apparatus as defined in claim 3, wherein said rotation preventing means comprise cooperating parallel flat surfaces on said rods and on said end connecting links, respectively.

5. Apparatus as defined in claim 4, wherein said cooperating flat surfaces extend parallel to the longitudinal axis of the rod, and further including means for pressing said flat cooperating surfaces into frictional locking engagement.

6. Apparatus as defined in claim 4, wherein said cooperating flat surfaces are obliquely arranged relative to the longitudinal axis of the rod, and further including means for pressing said surfaces into wedging locking engagement.

7. Apparatus as defined in claim 4, and further including screw thread means connected with said connecting links for reducing the size of the openings contained hterein, thereby to press the cooperating flat surfaces on said rods and said end connecting links into tight engagement.

* * * * *